United States Patent [19]

Brashears

[11] Patent Number: 5,193,291

[45] Date of Patent: Mar. 16, 1993

[54] SOIL REMEDIATION APPARATUS AND METHOD

[75] Inventor: David F. Brashears, Belle Isle, Fla.

[73] Assignee: Gencor Industries, Inc., Orlando, Fla.

[21] Appl. No.: 863,134

[22] Filed: Apr. 1, 1992

Related U.S. Application Data

[63] Continuation of Ser. No. 609,620, Nov. 6, 1990, abandoned.

[51] Int. Cl.⁵ ............................................. F26B 7/00
[52] U.S. Cl. ........................................ 34/12; 34/135; 34/60; 110/226; 110/236; 110/246
[58] Field of Search ................. 34/164, 135, 136, 137, 34/139, 60, 12; 110/236, 226, 246, 166, 165 R, 346; 432/118; 241/DIG. 10

[56] References Cited

U.S. PATENT DOCUMENTS

| | | | |
|---|---|---|---|
| 2,341,101 | 2/1944 | Howard | 34/136 |
| 2,959,407 | 11/1960 | Irish | 34/135 |
| 4,667,609 | 5/1987 | Hardison et al. | 110/236 |
| 4,730,564 | 3/1988 | Abboud | 119/246 |
| 4,827,854 | 5/1989 | Collette | 110/226 |
| 4,951,417 | 8/1990 | Gerken et al. | 110/226 |
| 4,974,528 | 12/1990 | Barcell | 110/236 |

Primary Examiner—Henry A. Bennet
Assistant Examiner—Denise L. F. Gromada
Attorney, Agent, or Firm—Nixon & Vanderhye

[57] ABSTRACT

The portable soil remediation unit includes, on a wheeled flatbed truck, a rotary drum having a burner at one end and an inlet at its opposite end for flowing contaminated soil in counterflow relation to the hot gases of combustion for volatilizing the contaminants. Also mounted on the vehicle is a baghouse. The hot remediated soil is discharged into the baghouse for screw conveyance along the bottom of the baghouse to a baghouse discharge. The particulate-laden gases from the drum enter the baghouse at the opposite end and are separated into particles and clean exhaust gas. The hot remediated soil is in heat transfer contact with the particles and the particles release residual contaminants. The particles flow to the bottom of the baghouse for combination with the remediated soil in the screw conveyor. The hot remediated soil is additionally screened in the baghouse for large and small gradations, the large gradations being discharged from the baghouse for reprocessing. Rocks or organic materials may be introduced into the drum to mechanically clean the drum and assist in heat transfer to the soil.

22 Claims, 3 Drawing Sheets

SOIL REMEDIATION APPARATUS AND METHOD

This is a continuation of application Ser. No. 07/609,620, filed Nov. 6, 1990, now abandoned.

BACKGROUND AND SUMMARY OF THE INVENTION

The present invention relates to apparatus and methods for treating contaminated soils, particularly those containing hydrocarbon products and hydrocarbon chemicals, such as PCBs, and particularly relates to apparatus and methods for remediating hydrocarbon-contaminated soils in a thermally efficient, environmentally compatible and safe manner. The present invention further relates to a portable soil remediation unit.

Soils are frequently contaminated with hydrocarbon products and this constitutes a highly significant and major pollution problem. The contaminants may range from gasoline through heavy hydrocarbon products and hydrocarbon chemicals, such as PCBs. Various efforts have been directed to remediating the soil and one of the most effective is to thermally treat the soil. However, high cost is an inhibiting factor and, in many cases, is the result of inefficiently designed equipment and limited equipment capacities. For example, a major factor affecting the cost is fuel efficiency, as well as the downstream treatment of the residual gaseous components driven off from the soil. Thermal efficiency is disregarded in many systems. For example, water spray quench systems are frequently used for treating exhaust gas streams, often without regard to heat recovery. Heat recovery in high temperature fume incineration is also frequently ignored. Consequently, the cost for clean-up of contaminated soil ranges typically from $30 a ton to well over $300 per ton, depending on the level of contamination, type of contaminant, type of soil in which the contaminant exists, and overall quantity of the contaminant.

In these prior systems, the basic process for cleaning the soil is to expose it to high temperatures whereby the contaminant is volatilized and subsequently oxidized or processed in a reducing environment to leave a carbon char material in the soil. The temperatures at which the soils must be processed can vary substantially from as low as 300° F. discharge temperature on the soil to over 1,000° F. in order to obtain satisfactory low levels of total residual petroleum hydrocarbons. With these wide-ranging temperatures necessary to clean up a wide variety of contaminants, it is essential to design a remediation system which, not only effectively removes the contaminants, but does so in a thermally and, hence, fuel efficient manner.

Additionally, part of the substantial costs in remediating soil lies in transporting the contaminated soil to the remediation site and transporting the remediated soil back to the original site. Consequently, there is a need for a portable soil remediation unit which will afford similar thermal efficiencies and environmentally safe operations as those remediation units at fixed sites.

In accordance with the present invention, a thermally and fuel efficient system, which may be portable, i.e., transportable on a wheeled vehicle, is provided for cleaning a wide variety of soils contaminated with different hydrocarbon products. The system includes essentially a rotary drum having a contaminated soil inlet and a remediated soil outlet at opposite ends of the drum. A burner is provided for flowing hot gases of combustion in counterflow relation to the flow of soil through the drum. The flow of hot combustion gases in contact with the contaminated soil volatilizes the contaminants and substantially remediates the soil. The hot remediated soil is discharged from the drum into one end of a separator, e.g., a baghouse. The hot gases of combustion, now containing the particulates, including dust, from the soil, are passed from the soil inlet end of the drum into the separator adjacent its opposite end. For portability purposes, the drum and the separator, i.e., baghouse, are disposed in side-by-side relation on a wheeled vehicle, for example, a flatbed truck.

In the baghouse, the particulate-laden gases are separated into clean exhaust gas and solid particles, the latter flowing toward the bottom of the baghouse. The remediated soil discharged into the baghouse is conveyed by a screw conveyor to a remediated soil discharge outlet from the baghouse. The particles separated from the particulate-laden gas are combined with the remediated soil en route to the outlet. More particularly, the hot remediated soil in the baghouse is placed in heat exchange relation with the particulate-laden gases whereby the temperature of the particles is elevated to enable release of any residual hydrocarbons remaining on the particles, further cleaning the particles of hydrocarbons. This is accomplished in a thermally efficient manner within the baghouse because the open hopper of the baghouse permits the hydrocarbons to escape from the particles with relative ease. Also, dry-mixing the remediated soil and the clean particles assists to reconstitute the soil to its original gradation. Further, by placing the soil and particles in heat exchange relation within the baghouse, the soil is cooled, rendering it easier to handle and, of course, the heat is thereby used in an efficient manner to burn off the residual hydrocarbons on the particles. This heat transfer relation between the soil and particles also enables the temperature of the baghouse to be considerably lower than otherwise, while still affording satisfactory remediation of the particles. Also, by mixing the remediated soil and particles within the baghouse, dust and other environmentally unsafe particles are prevented from being emitted to the atmosphere as pollution.

In accordance with another feature of the present invention, there is provided a separator within the baghouse for separating the remediated soil into large and small gradations. For example, a vibratory screen may be located inside the baghouse adjacent the inlet for the remediated soil whereby the soil flows onto the screen for separation into large and small gradations. The smaller gradations, i.e., the soil material flowing through the screen, drops from the vibratory screen to the bottom of the baghouse hopper, where it is mixed with the particles separated from the particulate-laden combustion gases. The large gradations may be removed from the baghouse, thereby protecting the downstream conveying and mixing apparatus.

Additionally, in certain types of contaminated soils, large gradations of soil, for example, aggregates of two inches in diameter and greater, may be incompletely remediated in the drum. That is, only the surface of the large aggregates may be fully remediated, with the interior of the aggregate harboring additional contaminants. By passing these large aggregates over the vibratory screen, they are mechanically reduced and the remaining reduced, but still large, aggregates may be removed from the baghouse for reintroduction into the dryer. Thus, the progressively smaller aggregates may be completely remediated.

Further, certain contaminated soils may be so fine or sticky that heat transfer and material flow problems occur within the rotatable drum. In order to balance the gradation for better material flow and heat transfer in the drum, additional rocks or inorganic aggregate of large size may be fed simultaneously with the contaminated soil into the drum. These large size aggregates provide sufficient veiling within the drum, enabling heat transfer from the hot gases of combustion to the large size aggregates, thereby reducing the exit gas temperature of the drum entering the baghouse. Further, the larger aggregates mechanically clean the drum flighting by impact as the large aggregate veils within the drum and impacts the flights. There is also the additional benefit of improved heat transfer between the large aggregates and the contaminated soil within the drum. At the drum discharge and inlet to the baghouse, the large aggregates can be screened from the soil and returned to drum soil feed inlet bin for re-use. These hot, large aggregates therefore preheat the soil prior to its entry into the drum. While the screening can take place outside the drum, it is preferable to screen the materials within the baghouse so that the particulate matter may be captured without polluting the atmosphere.

In a preferred embodiment according to the present invention, there is provided apparatus for remediating contaminated soil comprising a rotary drum having an inlet and an outlet adjacent opposite ends thereof for receiving contaminated soil to be remediated and discharging remediated soil, respectively, a burner for flowing hot gases of combustion through the drum in heat transfer relation with the soil, thereby heating the soil, the drum having a second outlet for discharging gases laden with particulate matter from the soil, a separator having a first inlet in communication with the rotary drum outlet for receiving the hot remediated soil and a second inlet in communication with the second outlet of the drum for receiving the particulate-laden gases whereby the particulate-laden gases and remediated soil are placed in heat transfer relation one with the other within the separator, the separator separating the particulate-laden gases into particles and substantially clean exhaust gas for discharge to the atmosphere. Means are provided in the separator for combining the separated particles and the remediated soil and a discharge from the separator is provided for discharging the combined separated particles and remediated soil.

In a further preferred embodiment according to the present invention, there is provided a method of remediating contaminated soil comprising the steps of heating the soil in a rotating drum by flowing hot gases of combustion through the soil to volatilize the contaminants, flowing the remediated soil into a separator, flowing the particulate-laden gases from the drum into the separator, and in the separator, separating the particulate-laden gases into clean exhaust gases and particles. Further steps include locating the particle-laden gases in heat exchange relation with the remediated soil in the separator to release residual contaminants in the particles of the particulate-laden gases, combining the particles and remediated soil in the separator and discharging the combined particles and remediated soil from the separator.

Accordingly, it is a primary object of the present invention to provide novel and improved apparatus and methods for remediating contaminated soils in an environmentally safe manner having improved thermal and fuel efficiency whereby capital and operating costs are reduced and substantial portions of the heat in the system are recovered for use in the system, as well as to provide a soil remediation system which is portable for use at the job site.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
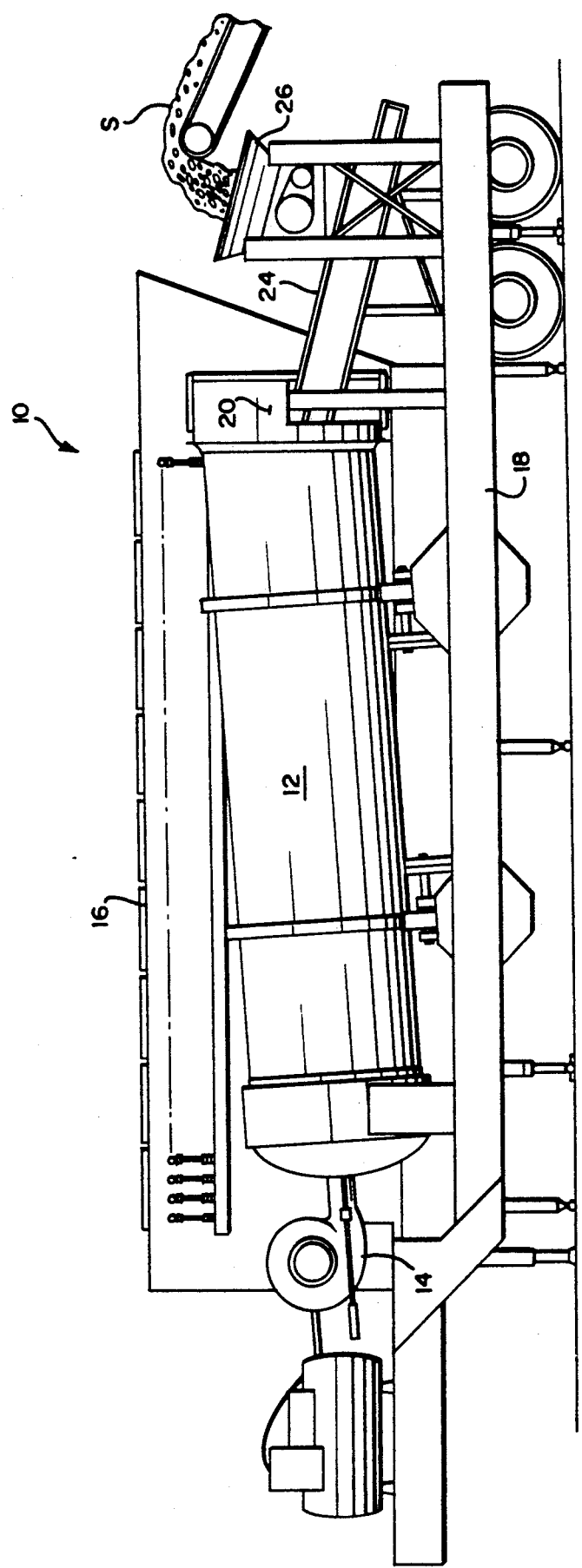
FIG. 1 is a side elevational view of a portable soil remediation unit constructed in accordance with the present invention.

Referring now to the drawings, particularly to FIG. 1, there is illustrated a portable soil remediation unit constructed in accordance with the present invention and generally designated 10. Principal elements of the soil remediation unit 10 include an inclined rotary drum 12, a burner assembly 14 for flowing hot combustion gases through drum 12, a baghouse 16 and a portable wheeled vehicle, for example, a flatbed truck 18, mounting the drum, burner and baghouse for transportation between work sites. Additional units for use with the soil remediation unit 10 are also provided but not shown. For example, additional conveyors are normally used to convey the contaminated soil from feed bins to the unit 10. Also, further clean air scrubbing units may be provided.

Figure 2:
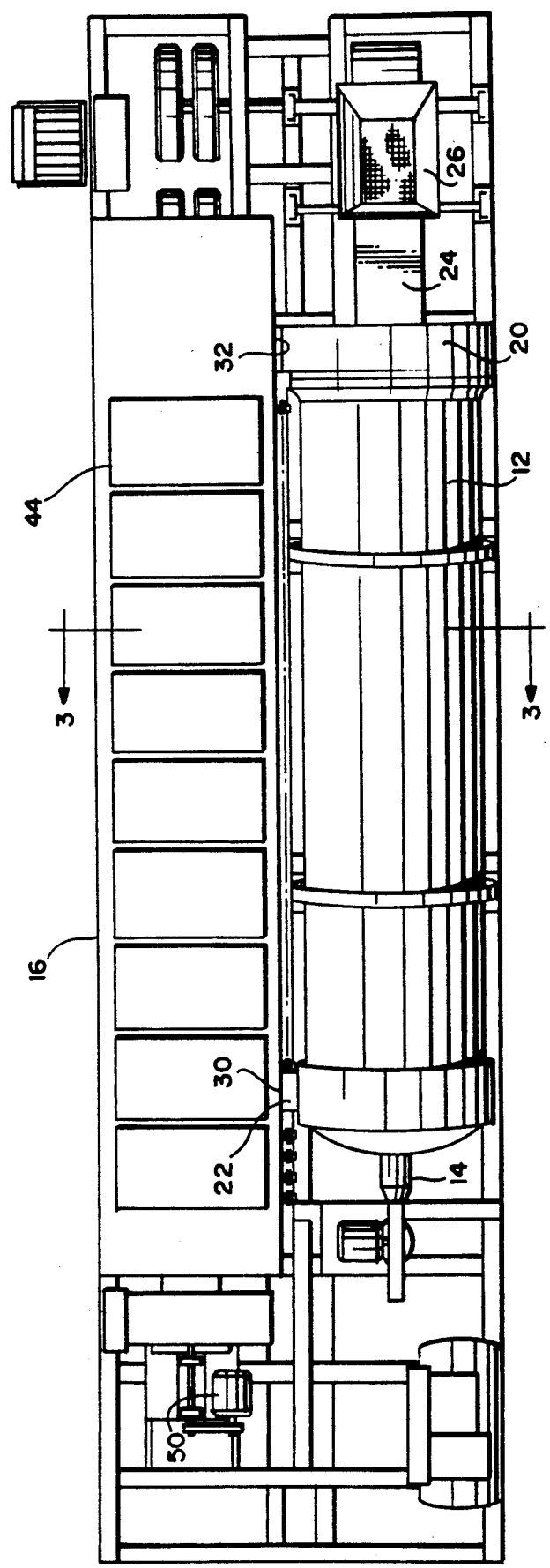
FIG. 2 is a top plan view thereof.
Figure 3:
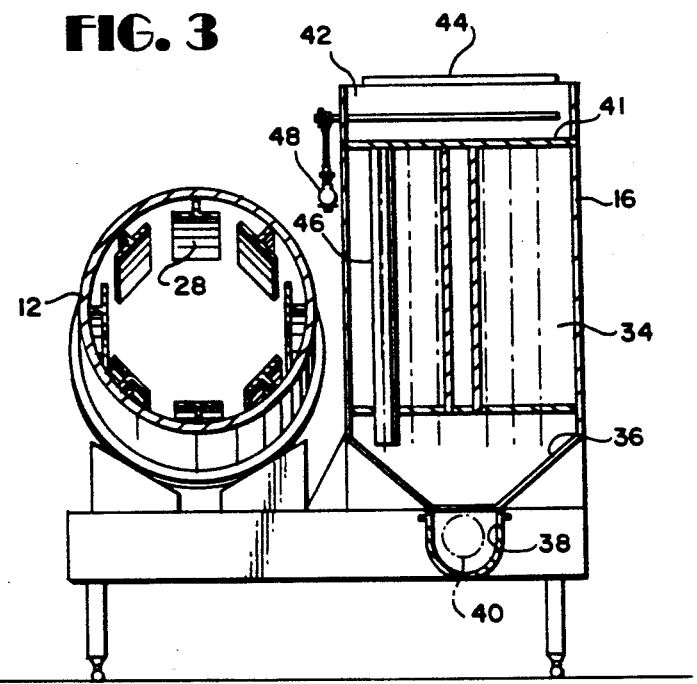
FIG. 3 is a cross-sectional view thereof taken generally about on line 3—3 in FIG. 2.
Figure 4:
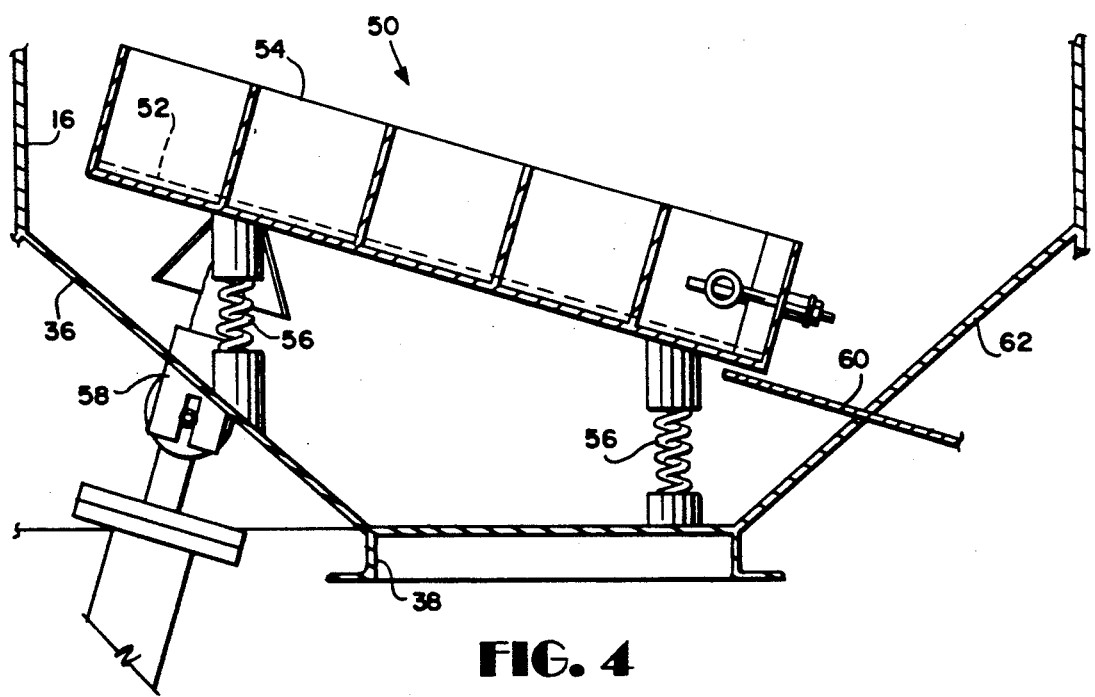
FIG. 4 is an enlarged fragmentary cross-sectional view through the soil inlet to the baghouse illustrating the vibratory screen.

As illustrated in FIGS. 1 and 2, drum 12 is rotatable about an inclined axis and has an inlet 20 adjacent its elevated end and an outlet 22 adjacent its lower end. Burner 14 is mounted adjacent the lower end for providing hot gases of combustion in counterflow relation to the flow of contaminated soil from inlet 20 along drum 12 for discharge through outlet 22. At the inlet end 20 of drum 12, there is provided a conveyor 24, a vibratory hopper 26 for receiving contaminated soil S and screening the soil to a predetermined size for flow along conveyor 24 into drum 12. With reference to FIG. 3, the interior of the drum is provided with a plurality of circumferentially spaced flights 28 (only a few of which are illustrated in enlarged schematic form). The flights are typically arranged in sections at axially spaced positions along the drum. The flights carry the contaminated soil S up one side of the drum and down the opposite side of the drum as the drum rotates, with the soil S continuously cascading from the flights during their traverse along the uphill and downhill sides of the drum. Thus, soil S forms a veiling pattern substantially across the entirety of the drum cross-section and through which drum the hot gases of combustion from burner 14 are passed in heat transfer relation therewith.

Baghouse 16 includes an inlet 30 for receiving the hot remediated soil from drum 12. Baghouse 16 also has an inlet 32 for receiving the particulate-laden hot gases of combustion from the soil inlet end of the drum 12. Referring now particularly to FIG. 3, the baghouse 16 generally comprises an elongated hopper having a dirty air chamber 34 extending substantially the entire length of the baghouse and terminating at its lower ends in inclined walls 36 for directing particles into a trough 38 containing a screw conveyor 40. The upper end of the dirty air chamber 34 is closed by a plurality of tube sheets 41, which separates the dirty air chamber 34 from a clean air chamber 42 above tube sheets 41. A plurality of doors 44 are disposed on top of baghouse 16 for access to the clean air chamber 42 and tube sheets 41.

Each tube sheet 41 has a plurality of openings, each of which receives the open upper end of an elongated filter bag 46. Filter bag 46 is essentially an elongated sock closed at its lower end for filtering the particulate-laden gases and enabling the clean gases to flow upwardly within the bags through the openings in the tube sheets 41 into clean air chamber 42. Air jets, not shown, are disposed above the bags and connected to a plenum 48 for periodically backflowing air into the bags for cleaning the bags. Thus, the particulate-laden gases enter the baghouse 16 through inlet 32 and pass in and about the filter bags 46, where the particles are separated from the clean gas. The particles flow downwardly in the dirty air chamber 34 for flow along walls 36 into the trough 38.

Consequently, it will be seen that the remediated soil enters baghouse 16 through baghouse inlet 30 adjacent the opposite end of baghouse 16 and is conveyed along the length of baghouse 16 by the screw conveyor 40. Thus, the hot remediated soil is placed in heat exchange relation with the particulate-laden gases within dirty air chamber 34 for driving off residual contaminants on the particles. The particles thus flow downwardly within the dirty air chamber 34 for collection in trough 38 and combination with the remediated soil. At one end of the trough 38, there is provided an outlet for discharging the combined remediated soil and particles from the trough 38. A motor 50 is provided on flatbed 18 for driving the screw conveyor 40.

Disposed inside the baghouse 16 adjacent the soil inlet 30 is a second separator, generally designated 50. Particularly, separator 50 is of a vibratory screen type which mounts a flat screen 52 between a pair of spaced end walls 54. The screen 52 is inclined with its upper end just below the remediated soil inlet 30 to baghouse 16 whereby the remediated soil falls onto screen 52 for separation into large and small gradations. Separator 50 is mounted on a plurality of coil springs 56 at each of its corners, the lower ends of which are fixed to suitable supports fixed in baghouse 16. That is, coil springs 56 are located adjacent opposite ends of the vibratory screen on the both the upper and lower sides of the screen. Centrally located between the uppermost coil springs 56 is a vibrator 58 for vibrating the vibratory screen separator 50. Vibrator 58 may be of any conventional construction, which will be apparent to those skilled in this art.

Consequently, when remediated soil S is disposed on vibrator 50 at its upper end, the soil is screened, separating the large and small gradations from one another. The small gradations flow through screen 52 for discharge along walls 36 and into trough 38 for conveyance by screw conveyor 40. The large gradations flow to the lower end of the vibratory screen separator 50 for discharge along a discharge chute 60 formed through an opening 62 in the inclined wall 36 of baghouse 16.

In operation, the soil remediation unit 10 of the present invention is transported on the wheeled vehicle 18 to the site of the contaminated soil. There, the soil is scooped from the ground and disposed in feed bins for conveyance into drum 12. As illustrated in FIG. 1, the soil S is first screened by screen 26 to a predetermined size and then conveyed by conveyor 24 into the upper end of drum 12. Rotation of drum 12 causes the flights 28 to cascade the contaminated soil in a veiling pattern across the interior of the drum as the soil travels from the inlet end 20 to the outlet end 22 of drum 12. Burner 14 supplies hot gases of combustion in counterflow relation to the flow of the soil and through the veiling soil to volatilize the contaminants of the soil. The dust and other particles from the soil form a particulate-laden gas stream which is discharged from the drum via outlet 32 for delivery into the dirty air chamber 34 of baghouse 16.

The hot remediated soil is received through inlet 30 in baghouse 16 and is preferably screened by the separator 50. Thus, large aggregates or clumps of soil may be removed from the baghouse through opening 62 while the small gradations of remediated soil flow into trough 38 for conveyance along baghouse 16 toward its opposite end by way of screw conveyor 40. Thus, the hot remediated soil is placed in heat transfer relation with the particulate-laden gases flowing in the dirty air chamber 34. The heat transferred to the particles of the gas stream is sufficient to further release hydrocarbons from the particles. It will be appreciated that the clean gas flows through the filter bags 46 into the clean air chamber 42 for discharge whereas the particles separated from the particulate-laden gas flow downwardly along wall 36 into trough 38 for combination with the remediated soil in trough 38. The combined remediated soil and particles are conveyed to a soil discharge from the baghouse. It will be appreciated that the mixing of the soil and particles together reconstitutes the soil in a manner corresponding substantially to its original gradation. Additionally, the mixing of the soil and particles cools the soil, rendering it easier to handle, and allows the baghouse to be run at a lower temperature. Note also that all of the mixing is provided within the baghouse and thus emissions from the baghouse are only those providing clean exhaust gas.

It is important to remove the large gradations of the remediated soil through the vibratory screen 50 in order to protect the conveying and mixing devices in the baghouse and their subsequent operation. The vibratory screen, however, serves the additional purpose of mechanically reducing large size aggregates of soil which cannot be completely remediated in one pass through the drum/baghouse combination. Thus, the vibratory screen separator 50 serves to remove outermost portions of the large aggregates and discharges reduced but still too large aggregates through the opening 62 for reintroduction into the drum and further remediation.

In those situations where the soil is fine or sticky, heat transfer and/or material flow problems frequently occur within the drum. In order to balance the gradation for better material flow and heat transfer, rocks or inorganic material can be fed into drum 12 simultaneously with the contaminated soil. By processing these rocks or inorganic materials in drum 12, they are placed in heat exchange relation with the hot gases of combustion and, within the drum, transfer that heat to the soil being remediated. The rocks or inorganic material also impact within the drum, particularly on the flights 28, to provide an effective way of mechanically cleaning the flighting and removing hard deposits of fine gradation material in the drums. These rocks or other inorganic materials may be screened by the vibratory screen 50 for re-use in the drum. Alternatively, a screen external to the drum and baghouse may be used.

It will thus be appreciated that there has been provided a thermally efficient and environmentally safe portable soil remediation unit which is effective to remediate soils of very different types.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for remediating contaminated soil comprising:
    a rotary drum having an inlet and an outlet adjacent opposite ends thereof for receiving contaminated soil to be remediated and discharging remediated soil, respectively;
    a burner for flowing hot gases of combustion through said drum in heat transfer relation with the soil, thereby heating the soil, said drum having a second outlet for discharging gases laden with particulate matter from the soil and bearing residual contaminants;
    a separator having a first inlet means in communication with said rotary drum outlet for receiving the hot remediated soil and a second inlet means in communication with the second outlet of said drum for receiving the particulate-laden gases, means within said separator for flowing the particulate-laden gases and remediated soil in heat transfer relation one with the other to release the residual contaminants from the soil;
    said separator separating the particulate-laden gases into particles and substantially clean exhaust gas for discharge to the atmosphere;
    means in said separator for combining the separated particles and the remediated soil; and
    a discharge from said separator for discharging the combined separated particles and remediated soil.

2. Apparatus according to claim 1 wherein said drum and said separator are mounted on a wheeled vehicle whereby the apparatus is portable and movable between work sites.

3. Apparatus according to claim 1 including a second separator for receiving the remediated soil from the drum and separating the remediated soil into large and small size gradations, the small size gradations constituting the remediated soil combined with the separated particles and discharged from the separator, and means for removing the large size gradations from said first separator.

4. Apparatus according to claim 3 wherein said second separator includes a vibratory screen.

5. Apparatus according to claim 4 wherein said combining means includes a screw conveyor for receiving the small size gradations from said second separator and the particles separated from the hot gas stream and conveying the combined separated particles and small size remediated soil gradations to said separator discharge.

6. Apparatus according to claim 5 wherein said drum and said separator are mounted on a wheeled vehicle whereby the apparatus is portable and movable between work sites.

7. A method of remediating contaminated soil comprising the steps of:
    heating the soil in a rotating drum by flowing hot gases of combustion through the soil to volatilize the contaminant;
    flowing the remediated soil into a separator;
    flowing the particulate-laden gases from the drum into the separator;
    in the separator, separating the particulate-laden gases into clean exhaust gases and particles;
    locating the particles in heat exchange relation with the remediated soil in the separator to release contaminants carried by the particles of the particulate-laden gases;
    combining the particles and remediated soil in the separator; and
    discharging the combined particles and remediated soil from the separator.

8. A method according to claim 7 including elevating the temperature of the particles of the particulate-laden gases in the separator by heat transfer from the remediated soil to release the contaminants carried by said particles.

9. A method according to claim 7 including dry-mixing the particles separated from the particulate-laden gases and the remediated soil within said separator.

10. A method according to claim 7 including, within the separator, separating the remediated soil into large and small gradations, removing the large gradations from the separator and combining the small gradations with the particles.

11. A method according to claim 10 wherein the step of separating is performed by screening the remediated soil into large and small gradations.

12. A method according to claim 11 including disposing the large gradations of the soil into the drum for reprocessing through the drum and separator.

13. A method according to claim 7 including, within the separator, mechanically reducing large gradations of the remediated soil.

14. A method according to claim 7 including introducing rocks or inorganic material of large gradations into the drum in heat transfer relation with the hot gases of combustion to reduce the exit temperature of the particulate-laden gases from the drum.

15. A method including to claim 7 including mechanically cleaning the drum by introducing rocks or inorganic material of large gradations into the drum during rotation thereof.

16. A method according to claim 7 including introducing rocks or inorganic material of large gradations into the drum in heat transfer relation with the hot gases of combustion to, in turn, afford heat transfer to the soil in the drum.

17. A method according to claim 7 including introducing rocks or inorganic material of large gradation into the drum in heat transfer relation with the hot gases of combustion, and, after discharge of the soil and rocks or inorganic material from the drum, screening the soil and rocks or inorganic material of large gradation introduced into the drum.

18. Apparatus for remediating soil contaminated with hydrocarbons comprising:

a rotary drum having an inlet and an outlet adjacent opposite ends thereof for receiving the hydrocarbon contaminated soil to be remediated and discharging remediated soil, respectively;

a burner for flowing hot gases of combustion through said drum in heat transfer relation with the soil, thereby heating the soil and volatilizing the hydrocarbon contaminants, said drum having a second outlet for discharging gases laden with particles from the soil contaminated with hydrocarbons;

a separator having a first inlet in communication with said rotary drum outlet for receiving the hot remediated soil and a second inlet in communication with the second outlet of said drum for receiving the gases laden with hydrocarbon contaminated particles, means carried by said separator for separating the gases laden with hydrocarbon contaminated particles into hydrocarbon contaminated particles and exhaust gas for discharge to the atmosphere, said separator being arranged such that the hydrocarbon contaminated particles and remediated soil are placed in heat transfer relation one with the other within said separator whereby the heat of the hot remediated soil vaporizes the hydrocarbons of the hydrocarbon contaminated particles, thereby remediating the particles;

means in said separator for combining the separated particles and the remediated soil; and a discharge from said separator for discharging the combined remediated particles and remediated soil.

19. Apparatus according to claim 18 wherein said drum and said separator are mounted on a wheeled vehicle whereby the apparatus is portable and movable between work sites.

20. Apparatus according to claim 18 including a second separator for receiving the remediated soil from the drum and separating the remediated soil into large and small size gradations, the small size gradations constituting the remediated soil combined with the remediated separated particles and discharged from the separator, and means for removing the large size gradations from said first separator.

21. Apparatus according to claim 20 wherein said second separator includes a vibratory screen.

22. Apparatus according to claim 21 wherein said combining means includes a screw conveyor for receiving the small size gradations from said second separator and the particles separated from the hot gas stream and conveying the combined remediated separated particles and small size remediated soil gradations to said separator discharge.

* * * * *